July 15, 1958     A. J. CARR, JR     2,843,810
ELECTRONIC POSITION AND MOTION CONTROL SYSTEMS
Filed Dec. 4, 1953
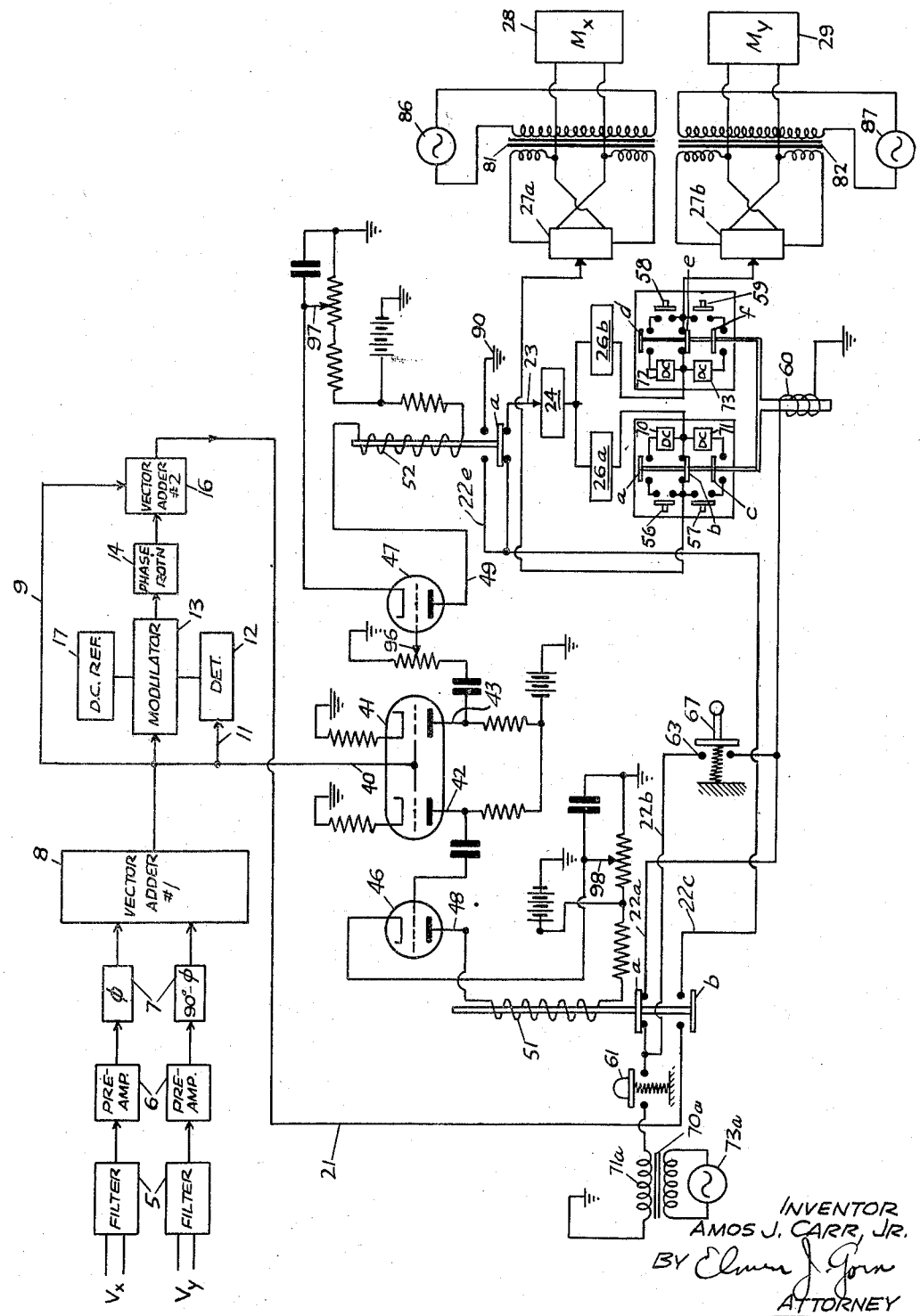
INVENTOR
AMOS J. CARR, JR.
BY
ATTORNEY

United States Patent Office 2,843,810
Patented July 15, 1958

2,843,810

ELECTRONIC POSITION AND MOTION CONTROL SYSTEMS

Amos J. Carr, Jr., Lexington, Mass., assignor to Raytheon Manufacturing Company, Waltham, Mass., a corporation of Delaware Application December 4, 1953, Serial No. 396,237

8 Claims. (Cl. 318—19)

This invention relates to electronic systems for supervising the position and motion of a controllable element, and particularly to a system motivated by two command signal voltages, corresponding to two vectorial components of the force acting upon the controllable element.

Patent No. 2,627,055, granted to Carlo L. Calosi on January 27, 1953, illustrates the application of such a system to the control of two complementary force applying motors which cooperate to maintain a stylus and cutting tool in tangential relationship to a template and work piece, respectively, so that the work piece is fashioned to have a contour duplicating that of the template, the stylus (and hence the cutting tool) being moved tangentially along the surface of the template by applying the two motor drives thereto at orthogonally related angles whose vectorial resultant is directed along the tangential line which the stylus is to follow. The actuating voltages for the two driving motors are derived from signal voltages set up by the stylus itself, as it moves along the tangential path referred to, the voltages applied to the respective motors depending upon the magnitude and direction of the "stressing force" as it is termed in said patent.

The system illustrated in the patent includes electronic means responsive to stylus deviation from the prescribed tangential course to restore the stylus to said prescribed tangential course, and thereby return the stressing force to the predetermined magnitude and direction. The present invention provides complementary electronic means responsive to extreme deviations in the stressing force, that is, "over-deflection" of the stylus, to interrupt the automatic control circuits, and to hold such control circuits interrupted pending return of the stylus to its prescribed path (or a suitable approximation thereof), whereupon the automatic control circuits again resume supervision of the stylus drive. In the intervening hiatus, the two stylus operating motors are supplied with energizing current by selective manual operation of circuits leading to the motors by routes which parallel the automatic circuit routes and which are themselves rendered ineffective again by automatic action, as soon as the stylus has returned to its normal, or near-normal, path.

The present invention also includes means for manually controlling the operation of the two stylus driving motors during the initial or "setting up" stage when the stylus has not yet acquired contact with the template, such manual control being discontinued as soon as the stylus-template contact becomes sufficiently firm to set up the degree of "stressing force" required to produce operating voltages of sufficient magnitude to permit the automatic electronic control circuits to "take over." When this point is reached the automatic pick-up means of the present invention comes into action to render the automatic control effective, and simultaneously to discontinue the effectiveness of the manual "setting up" means.

Suitable circuits for practising the invention, and additional aspects and characteristics thereof, are described in detail below, reference being made to the accompanying drawing showing the circuits schematically.

In the drawing reference numerals 28 and 29 designate the stylus operating motors, and numerals 5, 6, and 7 designate filter networks, pre-amplifiers and phase determining circuits shown in block form only, suitable actual circuit components and connections being fully shown and described in the Calosi patent above referred to, or in the Calosi and Carr patent applications, Serial Nos. 405,225 and 396,238, filed December 9, 1953, and December 4, 1953, respectively, now Patent No. 2,753,500 and No. 2,753,468, respectively. Also, as described in said patent and patent applications, these two parallel input circuits receive the two orthogonally related voltage inputs $Vx$ and $Vy$ constituting the abscicissal and ordinal components, respectively, of the stylus "stressing force," as above defined, and feed their respective voltage components to a pair of vector summation units 8 and 16 by way of parallel paths 9 and 11, the path 9 being a direct connection from unit 8 to unit 16, and the path 11 being by way of detector unit 12, modulator 13 and phase rotator 14, which units are more fully illustrated and described in said Calosi patent application. From the unit 16 the consolidated signal energy proceeds by way of conductors 21, 22c and 23 to a phase divider 24 where it is resolved into its two quadrantally related components, and the separated components are directed into their respective amplifying, discriminating, and motor regulating assemblies 26a, 26b, 27a, and 27b, corresponding to the similarly designated units of the said Calosi patent application; but whereas, in the Calosi disclosure, the connection 21—23 is a direct signal-path conduit, the present invention interposes three alternately operative parallel conduits 22a, 22b, and 22c between the first and second stages of the line 21—23. These parallel conduits are the vehicles into which are incorporated the novel "over-deflection" and "setting up" procedures and mechanisms of the present invention. These will now be described in detail.

The output of the first vector summation stage 8, in addition to being directed into units 12, 13, and 16, as above noted, is also directed to both grids of a twin triode unit 41 whose plate circuits 42 and 43 activate the grids of triodes 46 and 47, respectively. The plate circuit 48 of triode 46 includes the windings of a relay 51, and the plate circuit 49 of triode 47 includes the windings of a relay 52. Relay 51 operates contactors 51a and 51b controlling parallel conduits 22a and 22c, respectively, and relay 52 operates contactor 52a controlling the final conduit section 22e, that is, a continuation of parallel branch circuit 22c. Manually operable button switches 56, 57, 58, 59 and 63 are also included in the the assembly of interrelated parts entering into the illustrated embodiment of the invention. These button switches are biased to their circuit-opening positions by springs except when the respective buttons are manually depressed.

To initiate a cycle of operation, the attendant closes the power control switch 61, thereby establishing current flow from the A. C. source 71a, which may be the secondary section of a transformer 70a whose primary section is energized from a source 73a. The current flows to relay 60 by way of the closed contactor 51a and conduit 22a. Operation of this relay 60 makes available D. C. sources 70—73 as substitutes for the normal discriminator output paths through contacts 60b and 60e, respectively. These D. C. sources can be selectively utilized to drive motors 28 and 29 in the respective desired directions as determined by manual closure of the direction-controlling jog buttons 56—59. The resulting voltages are applied through control units 27a and 27b and cause energization of the motors $Mx$ and $My$ by closing the secondary circuits of transformers 81 and 82, which circuits include said motors. The primary circuits of these transformers will normally have a common A. C. source although separate sources are indicated at 86 and 87, for convenience of illustration.

The energization of motors Mx and My in this manner will cause said motors to move the stylus toward the template. When contact of the stylus with the template is established, a stress begins to build up in the stylus, causing voltages Vx and Vy to be established in the input circuits leading to units 5, 6 and 7. These voltages unite in vector summation unit 8, as previously explained, and cause an A. C. grid signal excitation to be exerted upon the two grids of twin triode 41, by way of conduit 40. This initial grid excitation is not sufficient to render circuit 43 effective, but it is sufficient to cause circuit 42 to take effect, and said circuit 42 thereupon renders tube 46 conductive, so that relay 51 is energized by the current thus flowing in plate circuit 48.

This energization of relay 51 opens the circuit 22a at contactor 51a, and closes circuit 22c at contactor 51b. The automatic control of the stylus is thus taken over by circuit 22c, acting as the link between vector summation unit 16 and the succeeding stages 24, 26a, 26b, 27a, and 27b of the system.

In the ensuing automatic action, the contactor 52a remains in lower position illustrated unless and until, for any reason, the stylus should happen to "over-deflect," that is, move beyond the normal range within which the automatic control units are operative to effect restoration of the stylus to its prescribed path of tangency to the template's surface. Should such over-deflection occur, the resulting additional voltage rise in conduit 40 will be adequate to render the right-hand section of tube 41 effective, and, hence, convert tube 47 to the conductive state, by reason of the effect upon its grid of the increased voltage in plate circuit 43. This, in turn, will activate plate circuit 49 and cause energization of relay 52.

This energization of relay 52 raises contactor 52a to its upper position, thereby grounding the conduit 22e to the ground connection 90, and stopping the motors 28 and 29. At this junction in the cycle, the motors may be manually re-energized to "back off" the stylus from its over-deflected position so that the automatic control may again take over. Such manual re-energization is accomplished by depressing button 67 and thus closing the switch 63 to re-energize the relay 60. Then, with this switch 63 held closed by manual pressure, the attendant may control the motors by manual closing of the "jog" buttons 56 to 59 selectively. As soon as stylus over-deflection is sufficiently reduced by this manual "backing-off" of the stylus operating motors 28 and 29, the relay contactor 52a will drop down again to unground the conduit section 22c and thereby re-establish automatic control by way of the normal operating path 21, 22c and 23, the contactor 51b being still in the upper position to which it moved earlier in the cycle, thus maintaining section 22c closed for current flow. The attendant may now release button 67, whereupon switch 63 reopens.

The over-deflection point at which relay 52 is energized is adjustable by shifting resistor tap 96 in the grid circuit of tube 47. The point at which the relay 52 "drops out" is adjustable by shifting resistor tap 97. Similarly shifting of resistor tap 98 will adjust the "pull-in" point of relay 51.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, means for converting a stressing force into a proportional voltage, means providing a fixed voltage representative of a desired magnitude of said stressing force, means for comparing said proportional and fixed voltages, means for applying a compensating force when said stressing force deviates from said desired magnitude, said compensating force applying means including dynamo-electric means having an energizing circuit responsive to said comparing means, and means controlled by a rise in said proportional voltage to an abnormally high level for rendering said energizing circuit ineffective.

2. In combination, means for converting a stressing force into a representative voltage, means for providing a fixed voltage representative of a desired magnitude of said stressing force, means responsive to said representative voltage and to said fixed voltage to maintain said stressing force within predetermined limits, means for applying said representative voltage to maintain said stressing force within predetermined limits, said limiting means including an electric motor operative to tend to control the magnitude of said stressing force, electromagnetic switch means controlling energization of said motor, electronic means controlling energization of said electromagnetic switch means, and means controlled by a rise in said representative voltage to an abnormally high level for rendering said electronic means effective to cause energization of said electro-magnetic switch means.

3. In combination, means for converting a stressing force into a representative voltage, means for providing a fixed voltage representative of a desired magnitude of said stressing force, means responsive to said representative voltage and to said fixed voltage to maintain said stressing force within predetermined limits, said limiting means including an electric motor operative to tend to control the magnitude of said stressing force, manually-operable means including an energizing source for energizing said motor initially to develop said stressing force, and electronically-controlled means responsive to said representative voltage for rendering said energizing source ineffective as soon as said motor develops a predetermined stress.

4. In combination, means including an electric motor for driving an element to apply a stressing force to a body, a control circuit for said motor including a pair of switches in said circuit, one of said switches being initially in a closed-circuit position and connected to means including an energizing source for initially energizing said motor, another of said switches being initially in an open-circuit position and manually operable for energizing said motor with said energizing source, means responsive to movement of said element to a stress-establishing position for energizing said initially-closed switch to move to an open-circuit position connected to said motor, and means responsive to a deviation of the stress applied to said body from a preselected value and connected to said last-named open-circuit position for applying a correcting signal to said motor.

5. In combination, means including an electric motor for driving an element to apply a stressing force to a body, a control circuit for said motor including a pair of switches in said circuit, one of said switches being initially in a closed-circuit position and connected to means including an energizing source for initially energizing said motor, another of said switches being initially in an open-circuit position and manually operable for energizing said motor with said energizing source, electronic means responsive to movement of said element to a stress-establishing position for energizing said initially-closed switch to move to an open circuit position connected to said motor, and electronic means responsive to a deviation of the stress applied to said body from a preselected value and connected to said last-named open-circuit position for applying a correcting signal to said motor.

6. In combination, means including a pair of electric motors for driving an element to apply a stressing force to a body, a control circuit common to said motors including a pair of switches in said circuit, one of said switches being initially in a closed position and connected to means including an energizing source for initially energizing said motors, another of said switches being initially in an open-circuit position and manually operable for energizing said motors with said energizing source, electronically controlled electromagnetic means responsive to movement of said element to a stress-establishing position for moving said closed switch to an open-circuit position connected to said motors, and means responsive to a deviation of the stress applied to said body from a preselected value and connected to said last-named open-circuit position for applying a correcting signal to said motors.

7. In combination, means including a pair of electric motors for driving an element to apply a stressing force to a body, a control circuit common to said motors including a pair of switches in said circuit, one of said switches being initially in a closed-circuit position and connected to means including an energizing source for initially energizing said motors, another of said switches being initially in an open-circuit position and manually operable for energizing said motors with said energizing source, means responsive to movement of said element to a stress-establishing position for energizing said initially-closed switch to move to a circuit-opening position connected to said motors, and means responsive to an abnormal stress applied to said body for opening the connection to said motors in said last-named open-circuit position.

8. In combination, means including a pair of electric motors for driving an element to apply a stressing force to a body in contact with said element, a control circuit common to said motors including a pair of switches in said circuit, one of said switches being initially in a closed-circuit position and connected to means including a first energizing source for initially energizing said motors, means including a second energizing source connected to said closed-circuit position for energizing said initial energizing means, another of said switches being initially in an open-circuit position and manually operable for energizing said motors with said first energizing source, means responsive to movement of said element to stress-establishing position for energizing said initially-closed switch to move to a circuit-opening position connected to said motors, and means including electromagnetic means responsive to an abnormal stress applied to said body for opening the connection to said motor in said last-named open-circuit position.

References Cited in the file of this patent

UNITED STATES PATENTS

| | | |
|---|---|---|
| 2,428,723 | Reeves | Oct. 7, 1947 |
| 2,492,745 | Hammes | Dec. 27, 1949 |
| 2,611,887 | Lobosco | Sept. 23, 1952 |
| 2,627,055 | Calosi | Jan. 27, 1953 |
| 2,673,314 | MacCallum | Mar. 23, 1954 |